(12) United States Patent
Lewis et al.

(10) Patent No.: US 7,909,394 B2
(45) Date of Patent: Mar. 22, 2011

(54) FOLDABLE/STOWABLE ROOF SYSTEM

(75) Inventors: Stephen J. Lewis, Harrison Township, MI (US); David Alan Smith, Macomb Township, MI (US); Keijo J. Huotari, Fenton, MI (US)

(73) Assignee: Magna International Inc., Aurora (CA)

( * ) Notice: Subject to any disclaimer, the term of this patent is extended or adjusted under 35 U.S.C. 154(b) by 39 days.

(21) Appl. No.: 12/326,407

(22) Filed: Dec. 2, 2008

(65) Prior Publication Data

US 2009/0146465 A1   Jun. 11, 2009

Related U.S. Application Data

(60) Provisional application No. 61/005,573, filed on Dec. 6, 2007.

(51) Int. Cl.
*B60J 7/11* (2006.01)
(52) U.S. Cl. ........................................ 296/218; 296/219
(58) Field of Classification Search .................. 296/218, 296/219

See application file for complete search history.

(56) References Cited

U.S. PATENT DOCUMENTS

| | | | | |
|---|---|---|---|---|
| 4,940,283 | A | * | 7/1990 | Androy .................... 296/216.04 |
| 5,267,774 | A | * | 12/1993 | Garner et al. ................. 296/218 |

* cited by examiner

*Primary Examiner* — Dennis H Pedder
(74) *Attorney, Agent, or Firm* — Warn Partners, P.C.

(57) ABSTRACT

The present invention is a foldable and stowable roof system which can be selectively detached from the vehicle and stored within a short amount of time. The foldable and stowable roof system of the present invention includes a first frame member connected to a roof member, a second frame member connected to a roof member, and a third frame member selectively connected to the first frame member and the second frame member. Also included is a fourth frame member selectively connected to the first frame member and the second frame member such that when the third frame member is connected to the first frame member and the second frame member, and the fourth frame member is connected to the first frame member and the second frame member, the first frame member, second frame member, third frame member, and fourth frame member, form a frame for supporting the roof member.

8 Claims, 9 Drawing Sheets

FOLDABLE/STOWABLE ROOF SYSTEM

This application claims the benefit of U.S. Provisional Application No. 61/005,573, filed Dec. 6, 2007.

FIELD OF THE INVENTION

The present invention relates to removable convertible tops for motor vehicles.

BACKGROUND OF THE INVENTION

Removable tops for convertible style automobiles are generally known. Convertibles are a popular type of automobile in which all, or a portion of, the roof is removable or retractable to allow the user to enjoy favorable weather conditions. When weather conditions are favorable, such as when the temperature is warm and there is minimal overcast, it is often desirable for the user to remove all or a portion of the vehicle's roof, to improve the overall driving experience of the vehicle.

There are different types of convertible tops. One type of convertible top is known as a "soft top." A soft top convertible has a vinyl or other cloth type of foldable material which is supported by a frame, with the frame having several pivotable members. The pivotable members and the flexibility of the material allow for the top to change between a deployed position, in which the cover is supported by the frame and prevents moisture from entering the vehicle, to a retracted position in which the soft top has been removed and the foldable frame members are retracted, usually in a location behind the vehicle passengers.

Another type of removable top is what is generally known as a "hard top." A hard top is a solid member which is disconnected in its entirety from the vehicle when desired by the user. A hard top is typically made of a metal or composite material having similar properties compared to the vehicle body, and does not have the foldable properties as compared to a soft top. The hard top style convertible is usually stored in a trunk or hatchback portion of the vehicle behind the passengers.

Hard top as well as soft top style convertibles can cover various portions of the vehicle. For instance, the convertible top can consist of the entire roof of the vehicle, covering the passengers in the backseat (if the vehicle has a backseat) and in the front seat, or the convertible roof can only cover the driver and front seat passenger. Additionally, convertible style vehicles also exist for vehicles known as "two-seaters." A two-seater style of vehicle is a vehicle in which there are only two seats, a driver and a passenger.

The use of convertible style vehicles has been met with various drawbacks. One type of drawback is the use of a removable top in a two-seater style vehicle in which space is limited. Additionally, there are some occasions where the user of the vehicle is driving and has traveled a significant distance from the user's home, and weather conditions change from being favorable to unfavorable. Under these types of circumstances, the driver may wish to remove the top from the vehicle; with some types of vehicles, there is no place for the removable top to be stored.

Accordingly, there exists a need for an improved type of convertible top for use with the vehicle which can be removed and stored easily within the vehicle such that the user can remove the top from the vehicle even after the user has traveled a significant distance from home.

SUMMARY OF THE INVENTION

The present invention is a foldable and stowable roof system which can be selectively detached from the vehicle and stored within a short amount of time. The foldable and stowable roof system of the present invention includes a first frame member connected to a roof member, a second frame member connected to a roof member, and a third frame member selectively connected to the first frame member and the second frame member. The present invention also includes a fourth frame member selectively connected to the first frame member and the second frame member such that when the third frame member is connected to the first frame member and the second frame member, and the fourth frame member is connected to the first frame member and the second frame member, the first frame member, second frame member, third frame member, and fourth frame member, form a frame for supporting the roof member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention

BRIEF DESCRIPTION OF THE DRAWINGS

Preferred embodiments of the present invention will now be described, by way of example only, with reference to the attached Figures, wherein.

DETAILED DESCRIPTION OF THE INVENTION

The following description of the preferred embodiment(s) is merely exemplary in nature and is in no way intended to limit the invention, its application, or uses.

Figure 1:
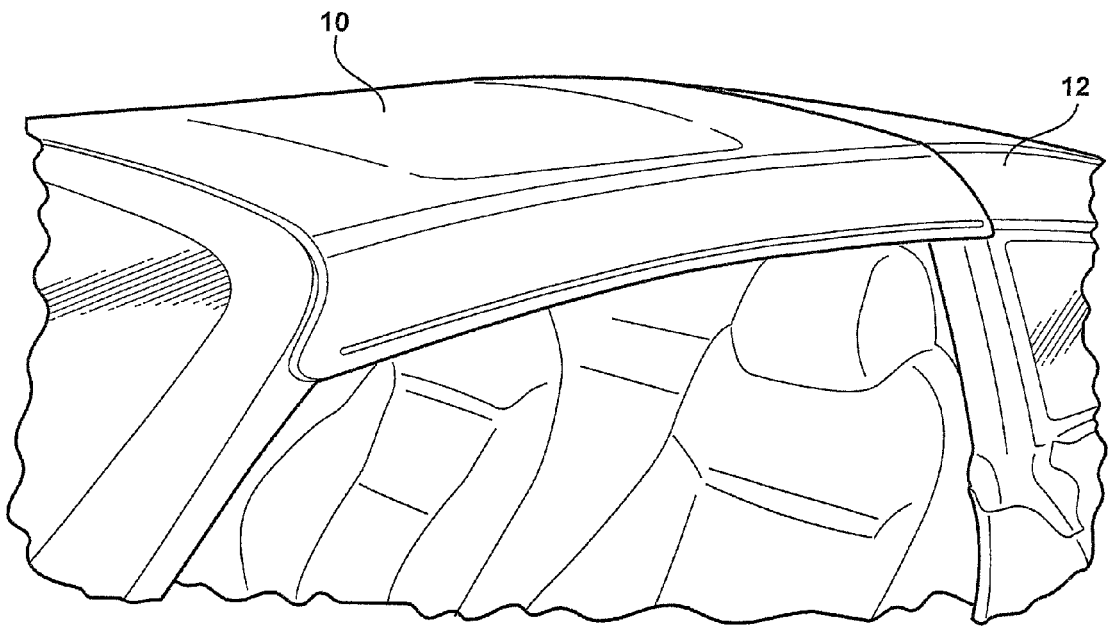
FIG. 1 is a perspective view of a foldable and stowable roof system connected to a vehicle, according to the present invention.

A stowable and foldable roof is shown in FIG. 1 generally at 10. Referring to the Figures generally, the roof 10 is selectively attached to a vehicle 12. The roof 10 includes a frame, generally shown at 14, which is made up of a first frame member or passenger side rail 16, a second frame member or driver side rail 18, a third frame member or front bow 20, and a fourth frame member or rear bow 22.

The side rails 16,18 are mirror images of one another and are connected to a roof member 24. The roof member 24 is a vinyl or other type of moisture proof material which can be used to prevent rain and other forms of moisture and debris from entering the vehicle 12. While it is shown that the side rails 16,18 are connected to the roof member 24, it is also within the scope of the invention that the front and rear bows 20,22 could be connected to the roof member 24, while allowing the present invention to operate in substantially the same manner.

Figure 13:
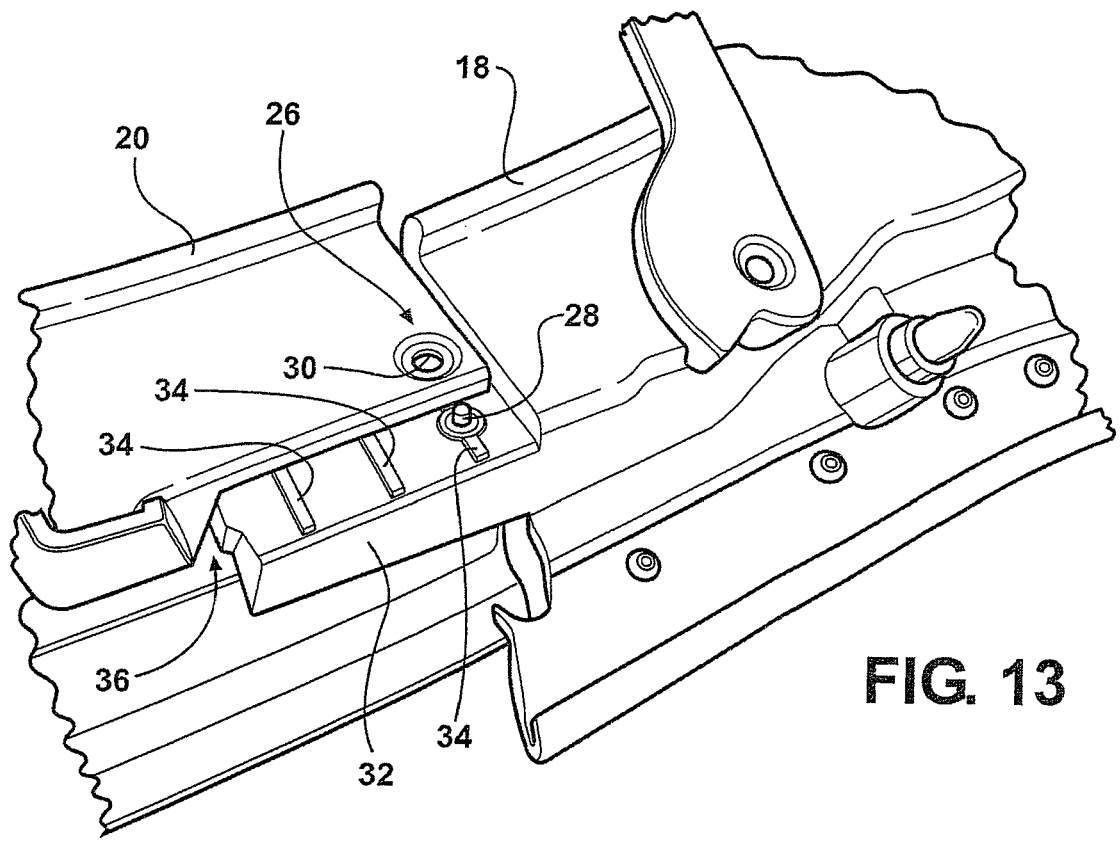
FIG. 13 is a perspective view of a release mechanism for connecting a driver side rail to a front bow in a disconnected position, for use in a foldable and stowable roof system, according to the present invention.
Figure 14:
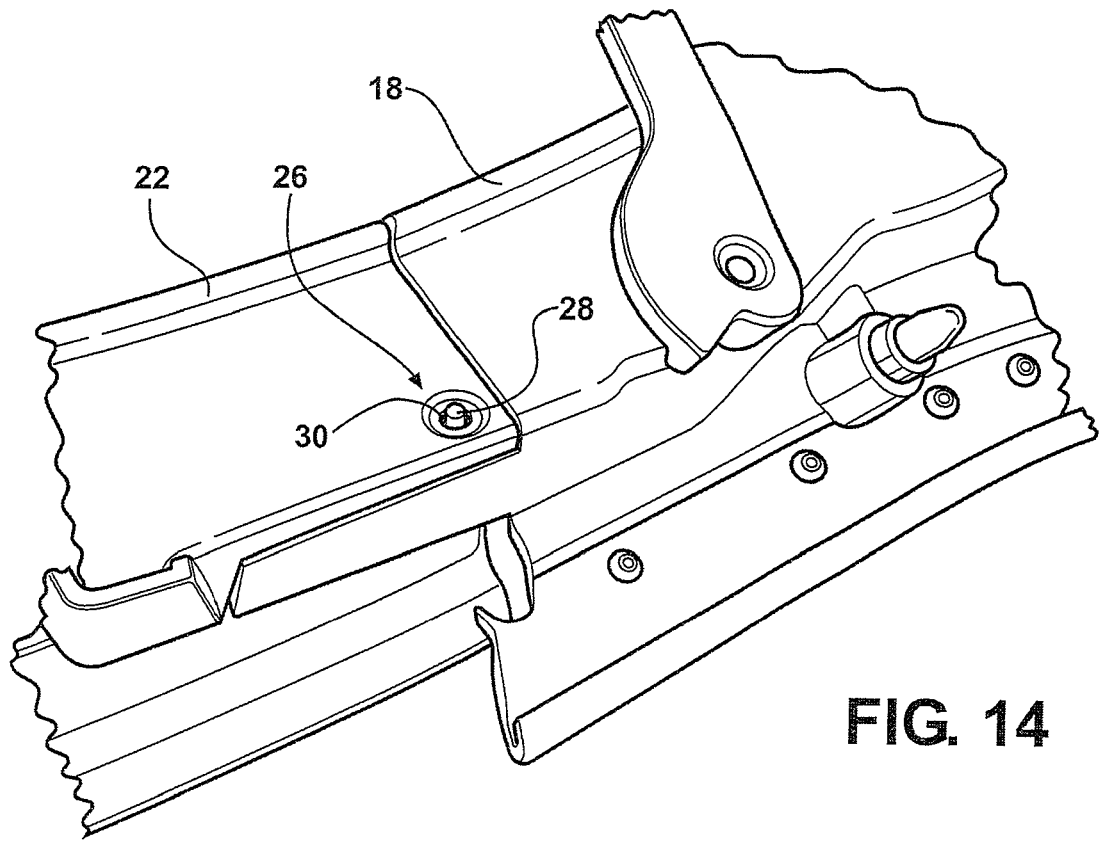
FIG. 14 is a perspective view of a release mechanism for connecting a driver side rail to a front bow in a connected position, for use in a foldable and stowable roof system, according to the present invention.

The side rail members 16,18 are connected to the bows 20,22 through the use of a release mechanism, shown generally at 26. There are a total of four release mechanisms 26 altogether, one for connecting the front bow 20 to the passenger side rail 16, another for connecting the front bow 20 to the driver side rail 18, yet another for connecting the rear bow 22 to the passenger side rail 16, and another for connecting the rear bow 22 to the driver side rail 18. An example of the release mechanisms 26 is shown in FIGS. 13 and 14, each of which includes a biasable member or male protrusion in the form of a retractable pin 28 which selectively nests within a respective aperture 30. The male protrusions 28 extend from a front extension 32 formed as part of each of the side rails 16,18, and located inside the front extension 32 is a spring (not shown) which biases the protrusion 28 toward the position shown in FIGS. 13 and 14. Formed on the front extensions 32 are a first set of alignment features or rails 34. The front extension 32 is operable to slide into and out of a first receiving area, generally shown at 36, formed on the front bow 20. The first receiving area 36 on the front bow 20 also includes a second set of alignment features or rails 38 which are operable with the first set of alignment features 34 for providing proper alignment when the front bow 20 is connected to the side rails 16,18. The front bow 20 includes two substantially identical receiving areas 36, one for receiving the front extension 20 on the passenger side rail 16, and another receiving area 36 for receiving the front extension 32 on the driver side rail 18.

Each side rail 16,18 also includes a rear extension 40. The rear extension 40 is substantially similar to the front extension 32. The rear extension 40 includes a third set of alignment features 42. The rear extensions 40 are operable to slide into and out of a second receiving area 44 formed as part of the rear bow 22 in a similar manner to which the front extensions 32 slide into and out of the first receiving area 36. The second receiving area 44 includes a fourth set of alignment features 46. The rear bow 22 includes two substantially identical receiving areas 44, one receiving area 44 for connecting the rear bow 22 to the passenger side rail 16 using the rear extension 40 on the passenger side rail 16, and another receiving area 44 for connecting the rear bow 22 to the driver side rail 18 using the rear extension 40 on the driver side rail 18.

Figure 2:
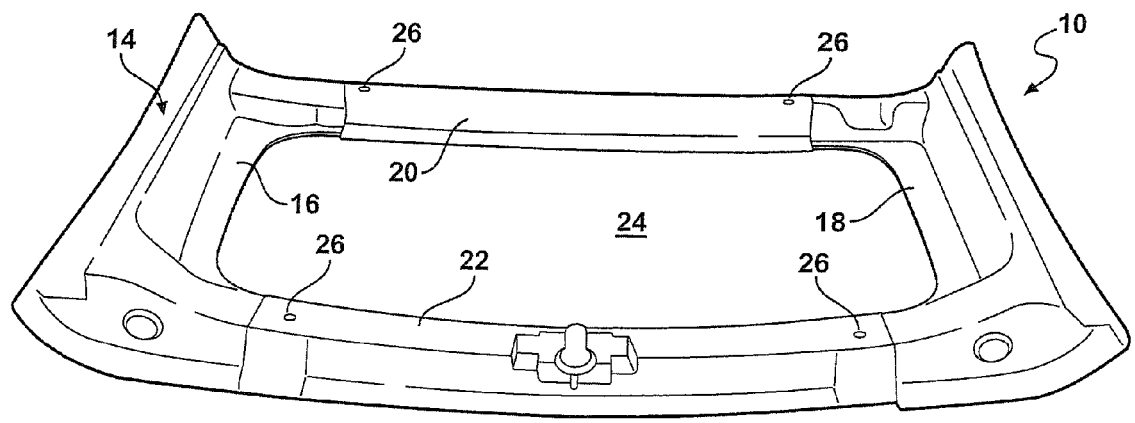
FIG. 2 is a perspective view of a foldable and stowable roof system, according to the present invention.
Figure 3:
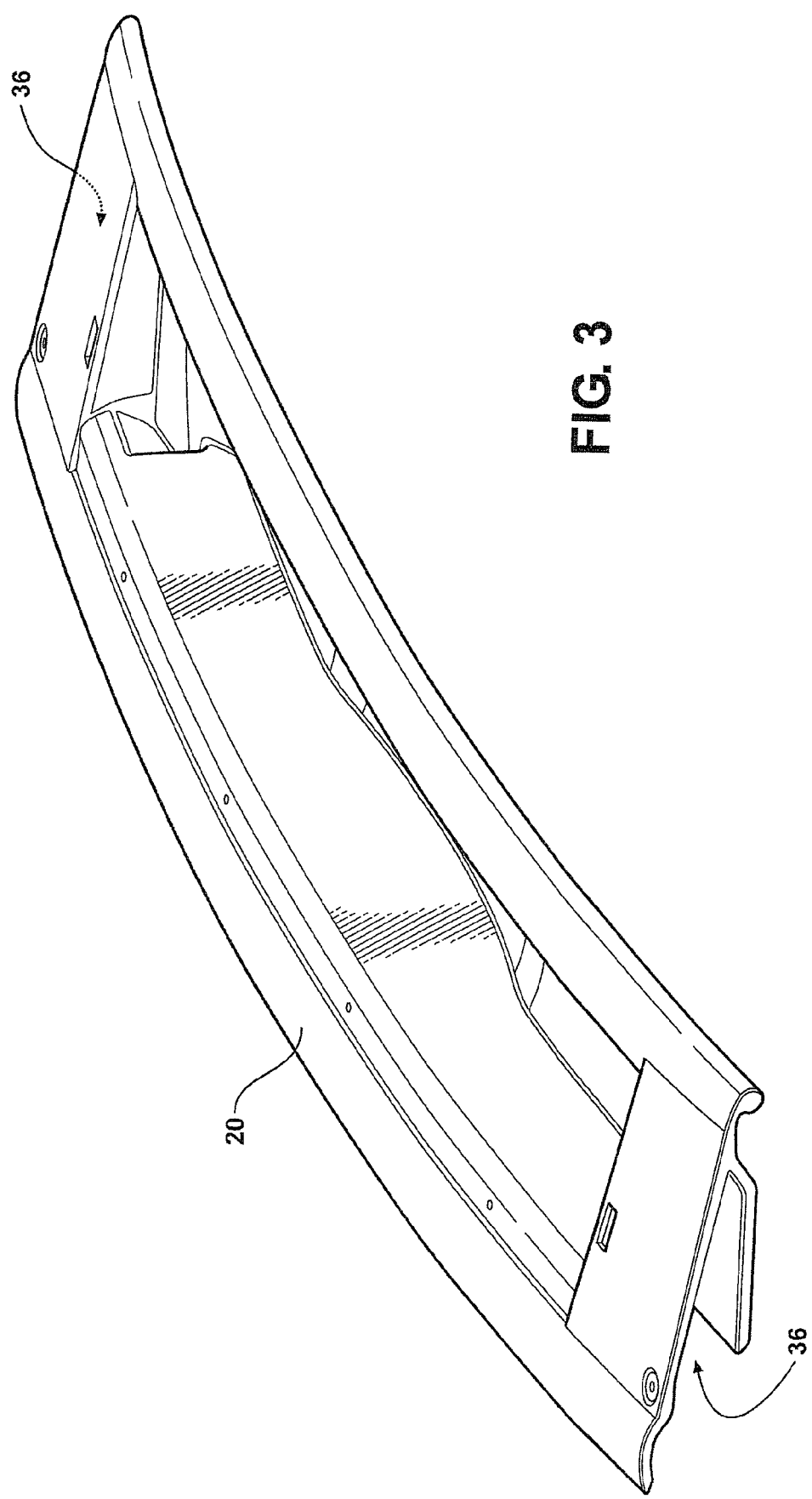
FIG. 3 is a perspective view of a front bow used in a foldable and stowable roof system, according to the present invention.
Figure 4:
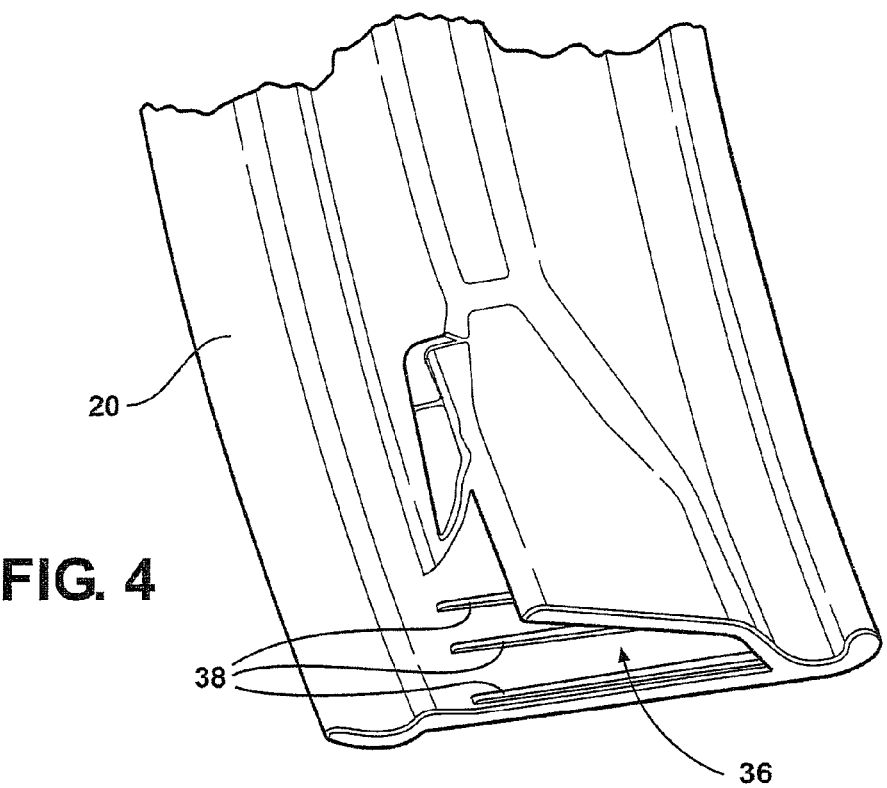
FIG. 4 is a first perspective view of a first receiving area formed as part of a front bow used in a foldable and stowable roof system, according to the present invention.
Figure 5:
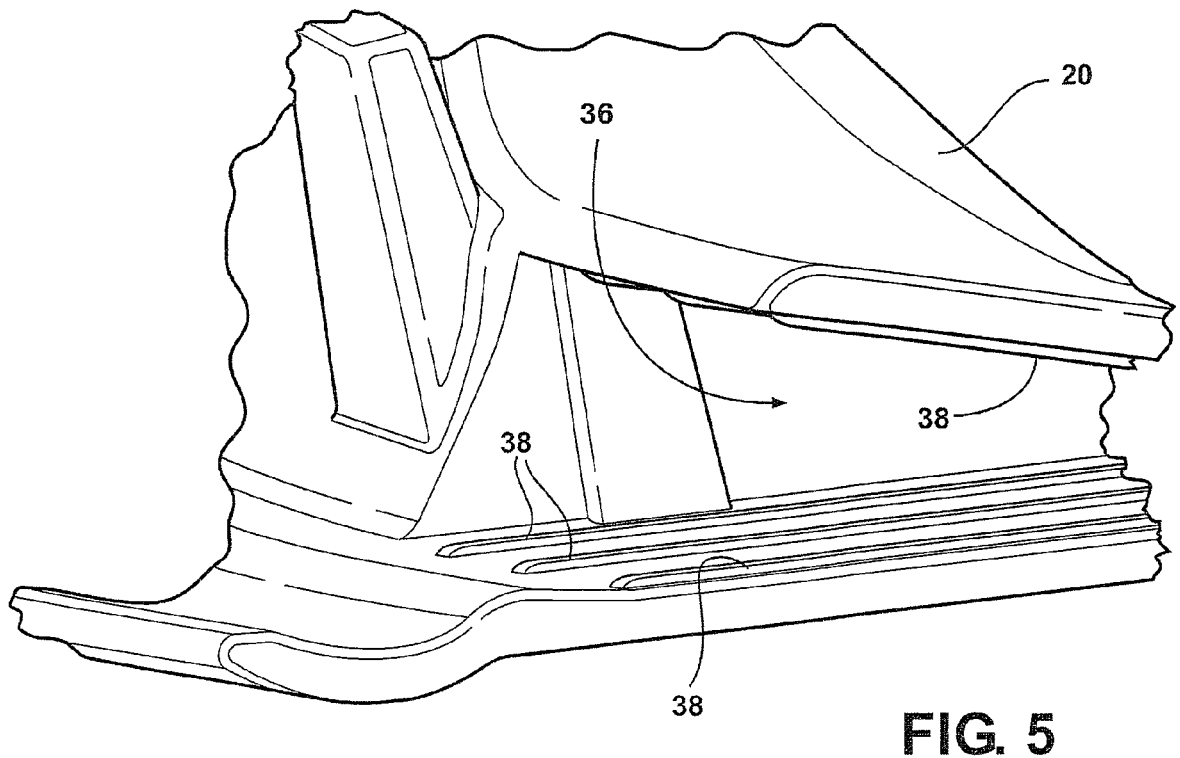
FIG. 5 is a second perspective view of a first receiving area formed as part of a front bow used in a foldable and stowable roof system, according to the present invention.
Figure 6:
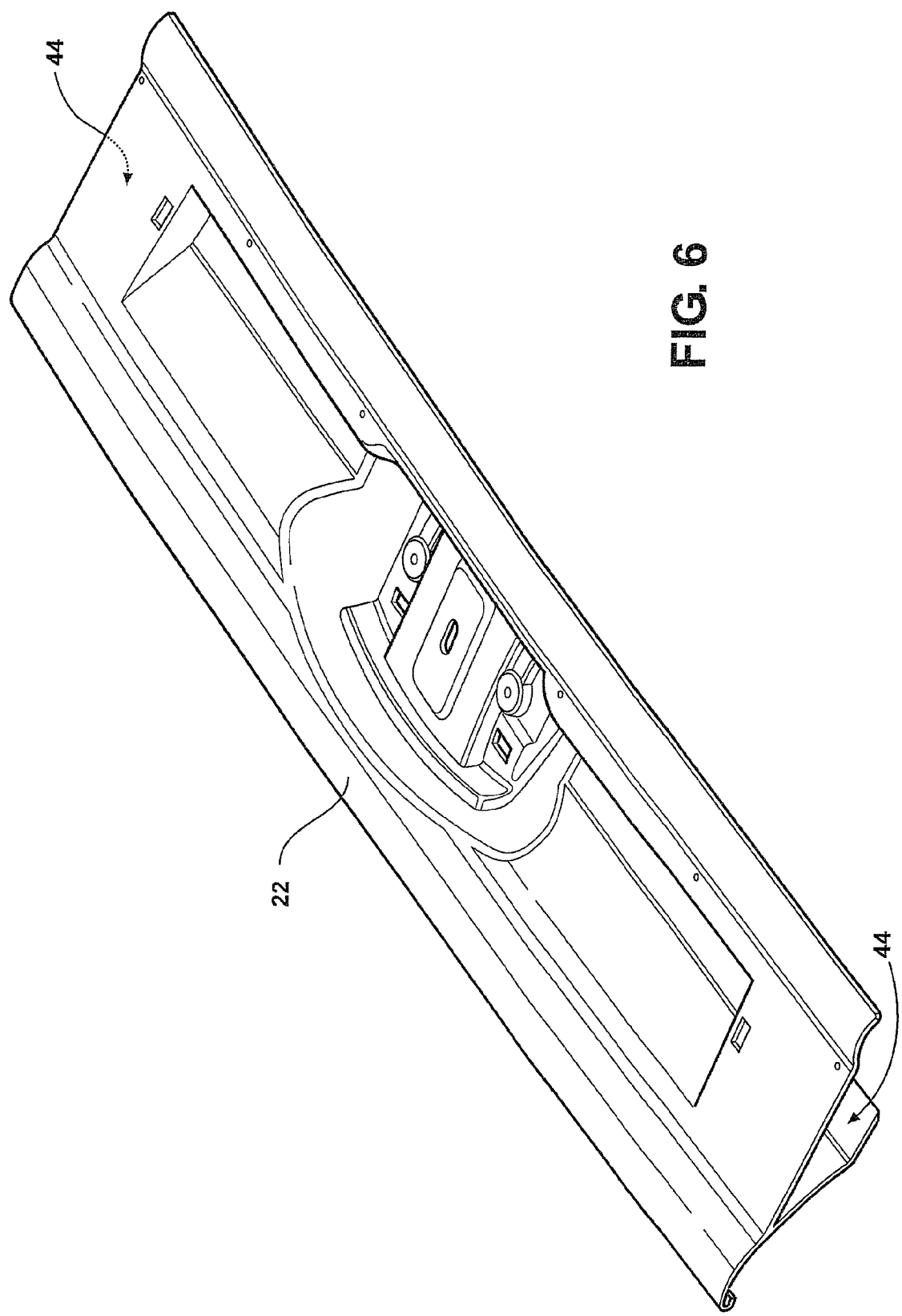
FIG. 6 is a perspective view of a rear bow used in a foldable and stowable roof system, according to the present invention.
Figure 7:
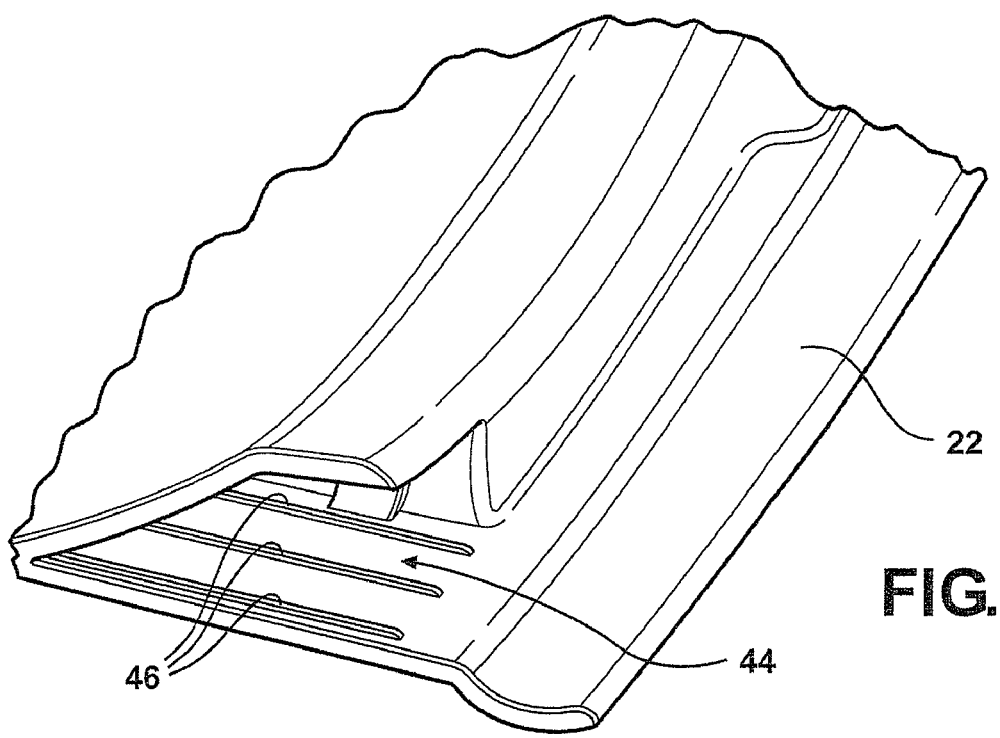
FIG. 7 is a first perspective view of a second receiving area formed as part of a rear bow used in a foldable and stowable roof system, according to the present invention.
Figure 8:
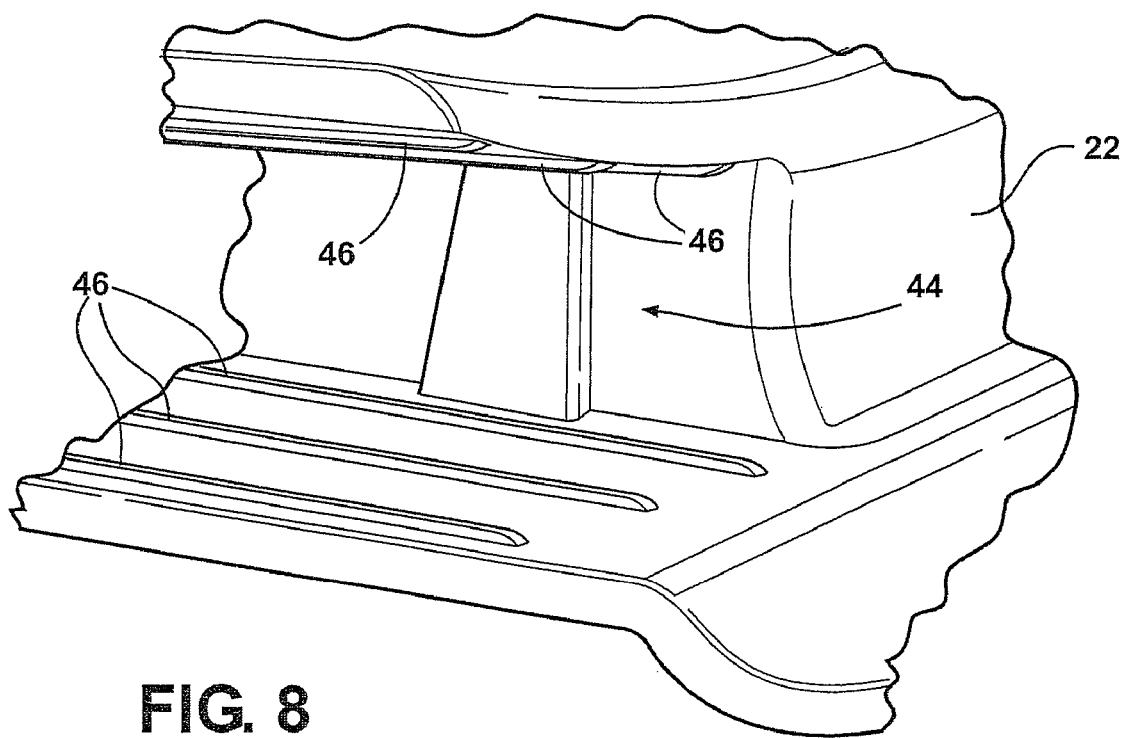
FIG. 8 is a second perspective view of a second receiving area formed as part of a second bow used in a foldable and stowable roof system, according to the present invention.
Figure 9:
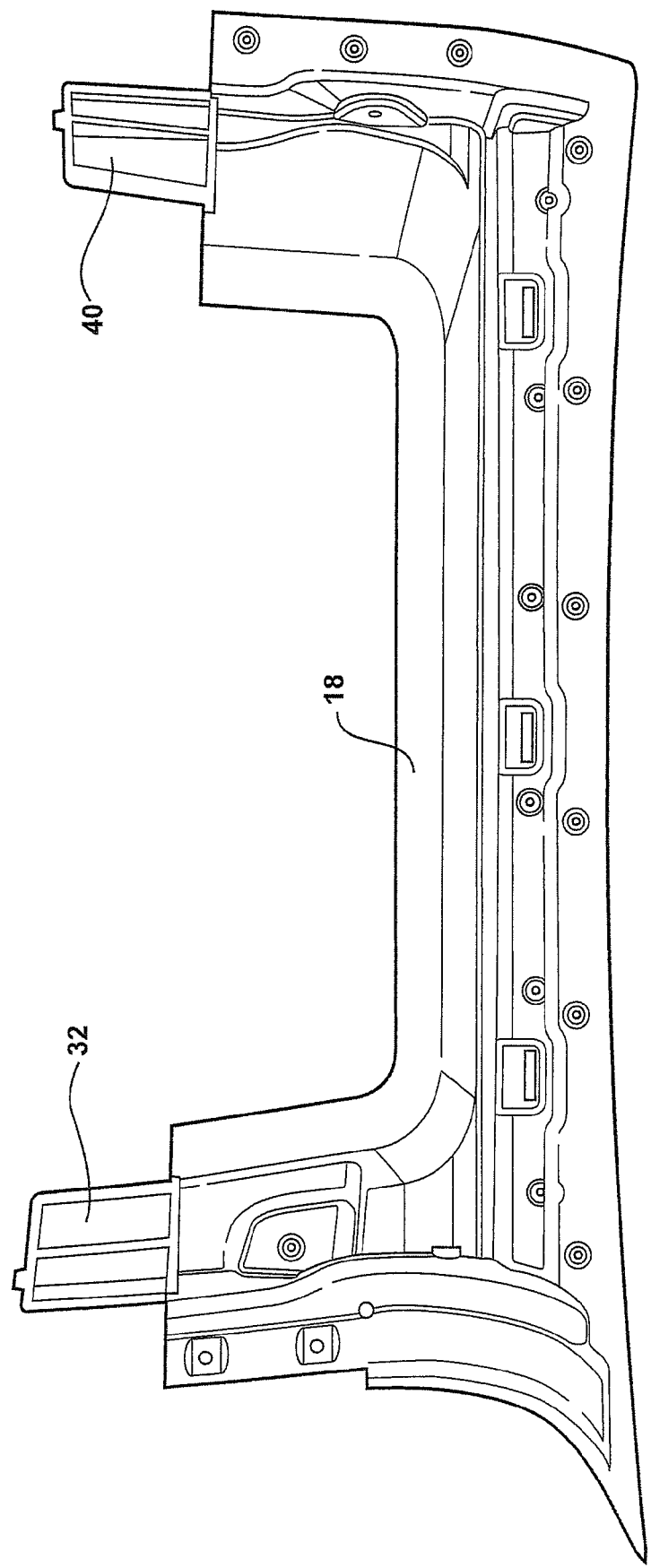
FIG. 9 is a top view of a driver side rail used in a foldable and stowable roof system, according to the present invention.
Figure 10:
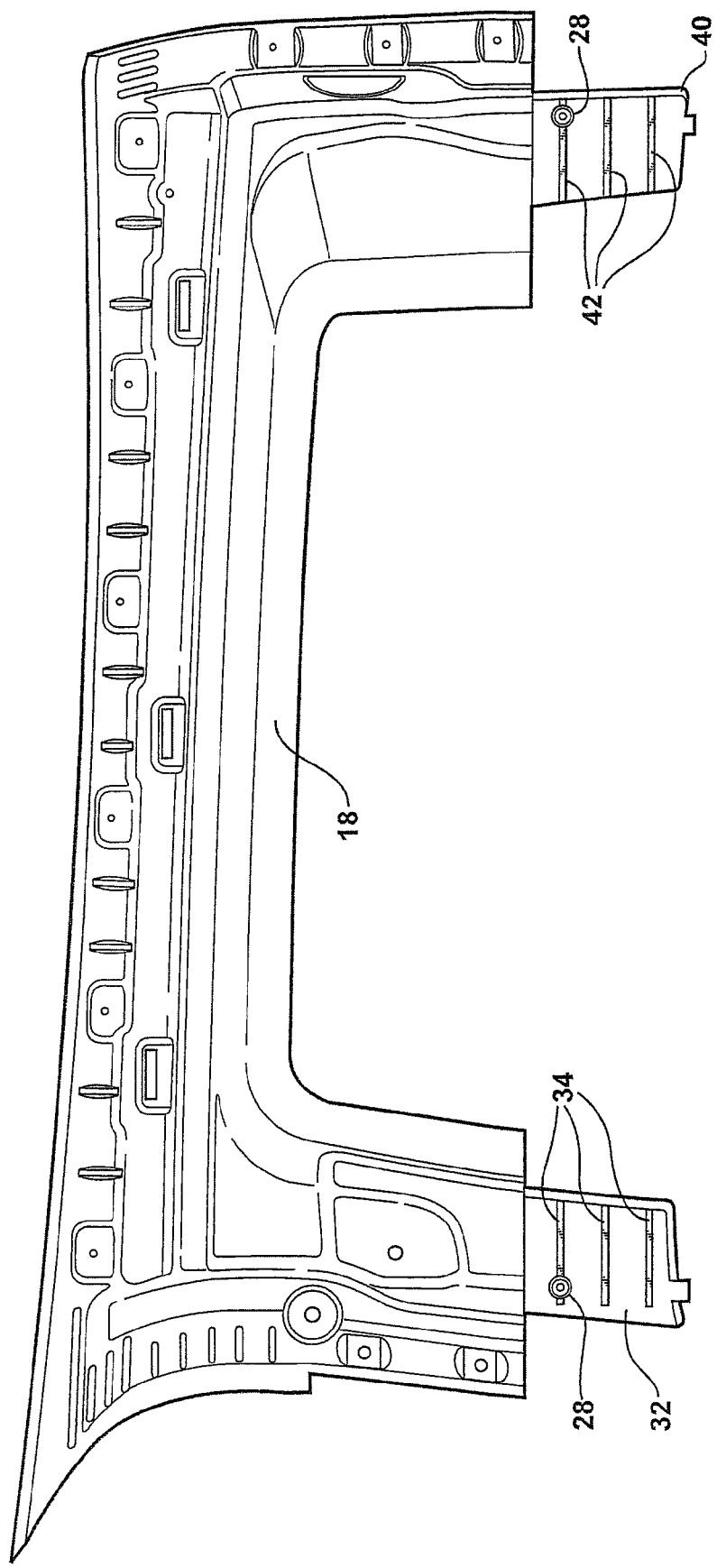
FIG. 10 is a bottom view of a driver side rail used in a foldable and stowable roof system, according to the present invention.
Figure 11:
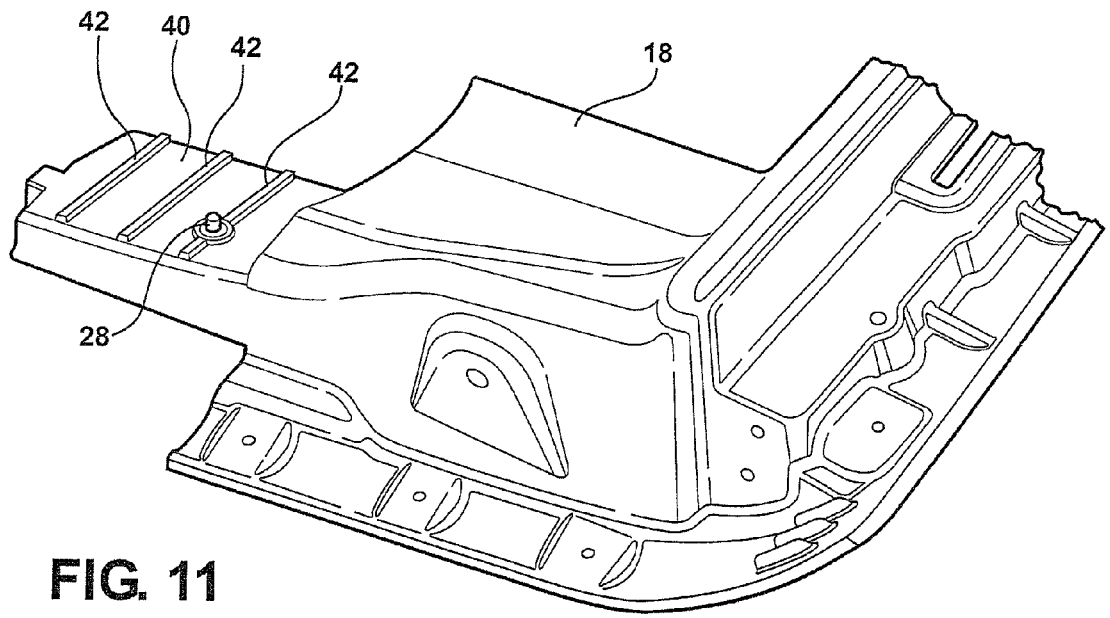
FIG. 11 is a perspective bottom view of a rear extension formed as part of a driver side rail used in a foldable and stowable roof system, according to the present invention.
Figure 12:
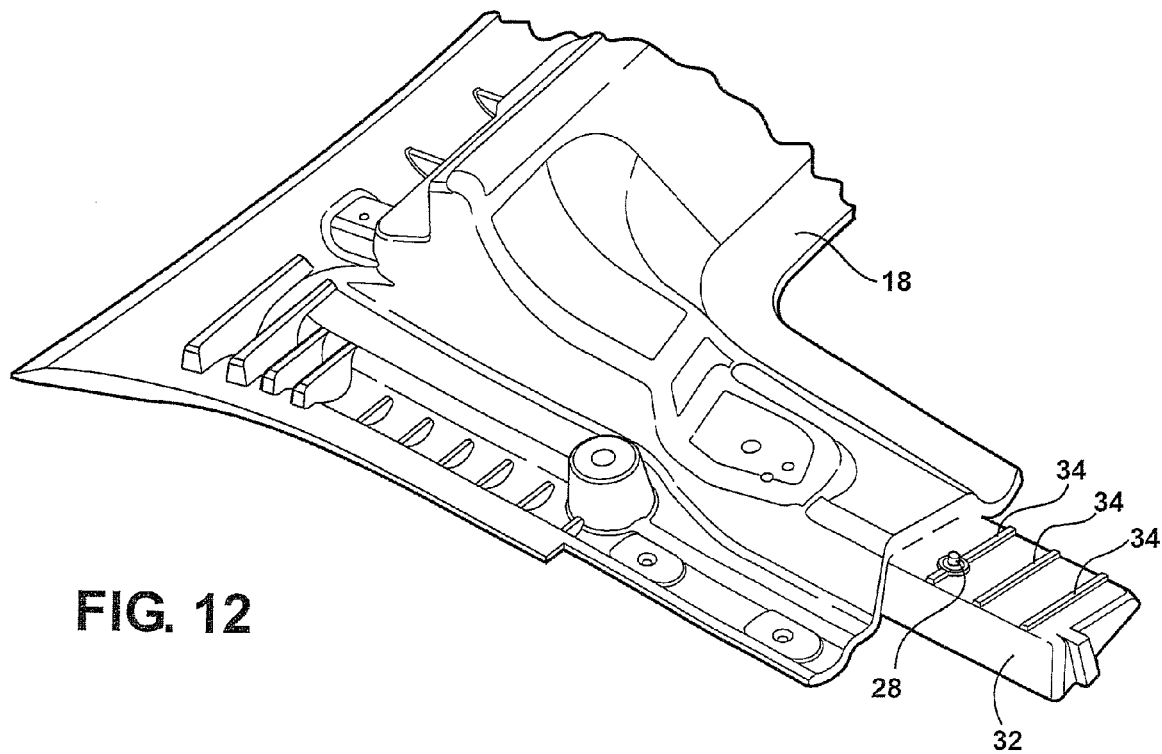
FIG. 12 is a perspective bottom view of a front extension formed as part of a driver side rail used in a foldable and stowable roof system, according to the present invention.

The front and rear bows 20,22 are selectively connectable to the side rails 16,18. As mentioned above, there are four release mechanisms 26, two for connecting the front bow 20 to each side rail 16,18, and two for connecting the rear bow 22 to each side rail 16,18. When the frame 14 is completely assembled, the frame 14 will appear as shown in FIGS. 1 and 2. The frame 14 applies tension to the roof member 24 when assembled. The roof member 24 is stretched over the frame 14 because of the roof member 24 being connected to the side rails 16,18. As seen in FIGS. 1 and 2, the frame 14 also forms part of the contour of the roof 10 when the frame 14 is assembled. It can be seen that the front and rear bows 20,22 are connected to the side rails 16,18, respectively. When it is desired to remove the roof 10 from the vehicle 12, the roof 10 can be removed from the vehicle 12 in a conventional manner. The roof 10 can then be disassembled and stored.

Once the roof 10 is removed from the vehicle 12, the roof 10 is then disassembled. There are four release mechanisms 26 which are used for disconnecting the side rails 16,18 from the front and rear bows 20,22. As mentioned above, the release mechanisms 26 include a male protrusion 28, which is selectively disposed within an aperture 30 through the use of an interference fit. While it has been discussed that the male protrusions 28 are located on the side rails 16,18, and there are two apertures 30 formed in each of the first receiving areas 36 (formed as part of the front bow 20), and two apertures 30 formed in each of the second receiving areas 44 (formed as part of the rear bow 22), it is within the scope of the invention that the protrusions 28 could be formed on the bows 20,22, and the apertures 30 could be formed on the side rails 16,18.

The operation of the four release mechanisms 26 is substantially the same, and therefore the operation of only one will be described. Also, the interaction between the first set of alignment features 34 and second set of alignment features 38 is substantially similar to the interaction between the third set of alignment features 42 and fourth set of alignment features 46, and therefore the interaction between the first set of alignment features 34 and second set of alignment features 38 will only be described.

Referring to FIGS. 13 and 14, an example of the operation of one of the release mechanisms 26 is shown. FIG. 13 shows the release mechanism 24 for connecting the front bow 20 to the driver side rail 18 in a released position. The front extension 32 slides into the receiving area 36 on the front bow 20 such that the first set of alignment features 34 contact and slide along the second set of alignment features 38. More specifically, as shown in the Figures, there is an inner, middle, and outer alignment feature in the first set of alignment features 34 and an inner, middle, and outer in the second set of alignment features 38. The first set of alignment features 34 and second set of alignment features 38 are located on the front extension 32 and receiving area 36 respectively such that as the front extension 32 slides into the receiving area 36, the inner most of the first set of alignment features 34 will slide against the inner most of the second set of alignment features 38. Additionally, the middle of the first set of alignment features 34 will slide against the middle of the second set of alignment features 38, and the outer most of the first set of alignment features 34 will slide against the outer most of the second set of alignment features 38. This will provide proper alignment and positioning of the front bow 20 relative to the driver side rail 18. Also, as the as the front extension 32 slides into the receiving area 36, the protrusion 28 will become retracted when the extension 32 is positioned in the receiving area 36 until the protrusion 28 is in alignment with the aperture 30. Once the protrusion 28 is in alignment with the aperture 30, the protrusion 28 will extend into the aperture 30 because of the spring located inside the extension 32.

To detach the front extension 32 from the first receiving area 36, a force is applied (by hand) to the front bow 20 and the driver side rail 18 in opposite directions such as to overcome the force of the spring biasing the protrusion 28 such that the protrusion 28 retracts into the front extension 32, allowing the front extension 32 to be removed from the receiving area 36.

Once the front and rear bows 20,22 have been detached from the side rails 16,18, the roof member 24 can be folded up and stored. Once in this folded position, it allows the roof 10 to be stored in the trunk or hatchback of the vehicle 12. The ease of which the roof 10 can be assembled and disassembled allows for the user to easily remove the roof 10 from the vehicle 12 and store the roof 10 away if the user decides to remove the roof 10 during a trip.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A foldable and stowable roof system for a vehicle, comprising:
    a roof member made of a substantially moisture resistant material;
    a passenger side rail connected to said roof member, said passenger side rail having a front extension and a rear extension;
    a driver side rail connected to said roof member, said driver side rail having a front extension and a rear extension;
    a front bow having more than one first receiving area;
    a rear bow having more than one second receiving area; and
    a plurality of release mechanisms, one of said plurality of release mechanisms being operable for selectively connecting said front extension of said passenger side rail to one of said more than one first receiving area, another of said plurality of release mechanisms being operable for selectively connecting said front extension of said driver side rail to one of said more than one first receiving area, another of said plurality of release mechanisms being operable for selectively connecting said rear extension of said passenger side rail to one of said more than one second receiving area, and one of said plurality of release mechanisms being operable for selectively connecting said rear extension of said driver side rail to one of said more than one second receiving area;
    a first set of alignment features, a portion of said first set of alignment features being formed on said front extension of said passenger side rail, and a portion of said first set of alignment features being formed on said front extension of said driver side rail, wherein at least a portion of one of said plurality of release mechanisms is integrally formed as part of said first set of alignment features; and
    a third set of alignment features, a portion of said third set of alignment features being formed on said rear extension of said passenger side rail, and a portion of said third set of alignment features being formed on said rear extension of said driver side rail, wherein at least a portion of one of said plurality of release mechanisms is integrally formed as part of said third set of alignment features.

2. The foldable and stowable roof system for a vehicle of claim 1, further comprising:
    a second set of alignment features, a portion of said second set of alignment features being formed on each of said more than one first receiving area, said second set of alignment features being operable for aligning with said first set of alignment features.

3. The foldable and stowable roof system for a vehicle of claim 2, wherein said portion of said first set of alignment features formed on said front extension of said driver side rail are in sliding contact with said portion of said second alignment features formed on one of said more than one first receiving area to provide proper positioning of said driver side rail relative to said front bow when said driver side rail is connected to said front bow.

4. The foldable and stowable roof system for a vehicle of claim 2, wherein said portion of said first set of alignment features formed on said front extension of said passenger side rail are in sliding contact with said portion of said second alignment features formed on one of said more than one first receiving area to provide proper positioning of said passenger side rail relative to said front bow when said passenger side rail is connected to said front bow.

5. The foldable and stowable roof system for a vehicle of claim 1, further comprising:
    a fourth set of alignment features, a portion of said fourth set of alignment features formed on each of said more than one second receiving area, said fourth set of alignment features operable for aligning with said third set of alignment features.

6. The foldable and stowable roof system for a vehicle of claim 5, wherein said portion of said third set of alignment features formed on said rear extension of said driver side rail are in sliding contact with said portion of said fourth alignment features formed on one of said more than one second receiving area to provide proper positioning of said driver side rail relative to said rear bow when said driver side rail is connected to said rear bow.

7. The foldable and stowable roof system for a vehicle of claim 5, wherein said portion of said third set of alignment features formed on said rear extension of said passenger side rail are in sliding contact with said portion of said fourth set of alignment features formed on one of said more than one second receiving area to provide proper positioning of said passenger side rail relative to said rear bow when said passenger side rail is connected to said rear bow.

8. The foldable and stowable roof system for a vehicle of claim 1, each of said plurality of release mechanisms further comprising:
    at least one biasable member formed on each of said front extension of said driver side rail, said front extension of said passenger side rail, said rear extension of said driver side rail, and said rear extension of said passenger side rail; and
    at least one aperture formed on each of said more than one first receiving area and said more than one second receiving area, wherein said at least one biasable member is selectively disposed within said at least one aperture for selective connection of said front bow to said passenger side rail, said front bow to said driver side rail, and from said rear bow to said passenger side rail, and from said rear bow to said driver side rail.

* * * * *